No. 635,654. Patented Oct. 24, 1899.
J. CANELLOPOULOS.
STEERING APPARATUS FOR MOTOR VEHICLES.
(Application filed May 10, 1899.)
(No Model.) 3 Sheets—Sheet 3.
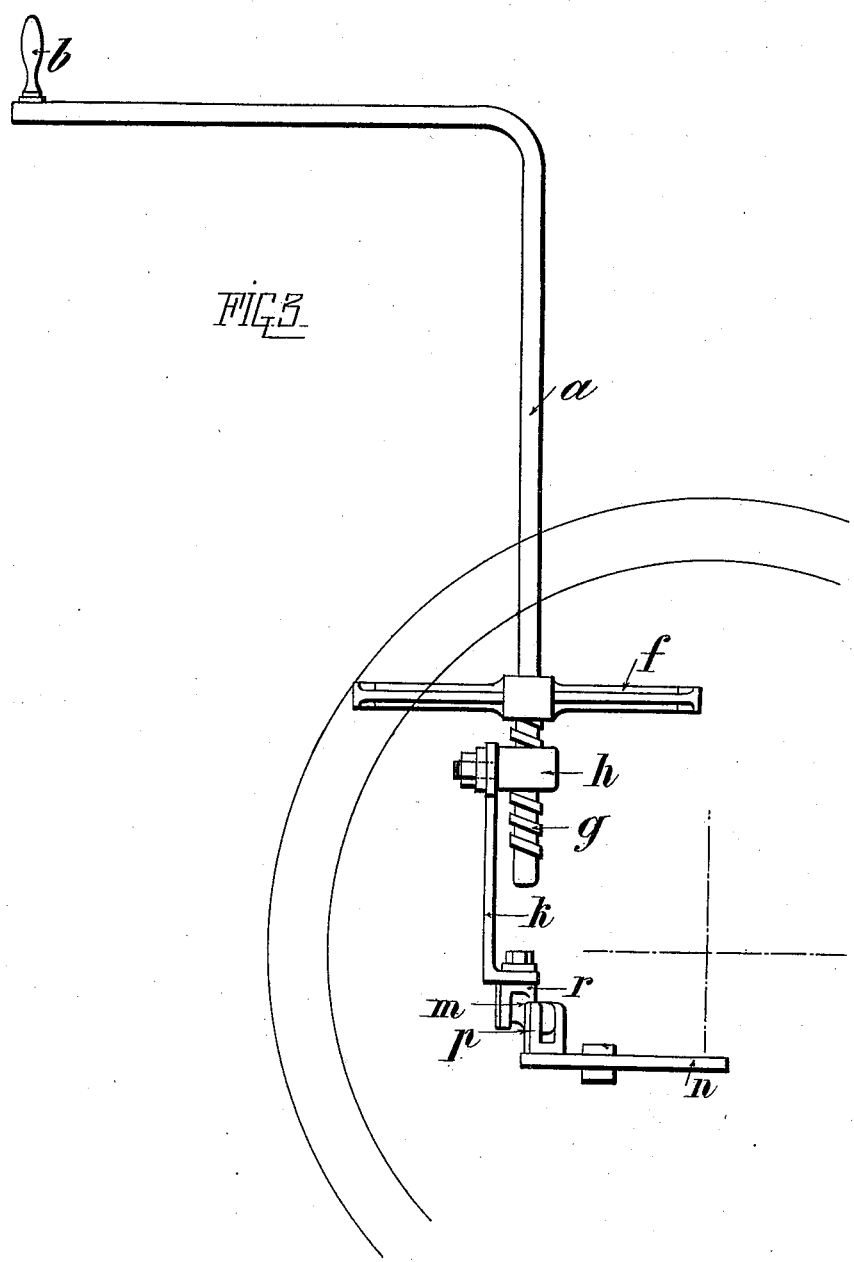
WITNESSES:
INVENTOR.
ATTORNEYS.

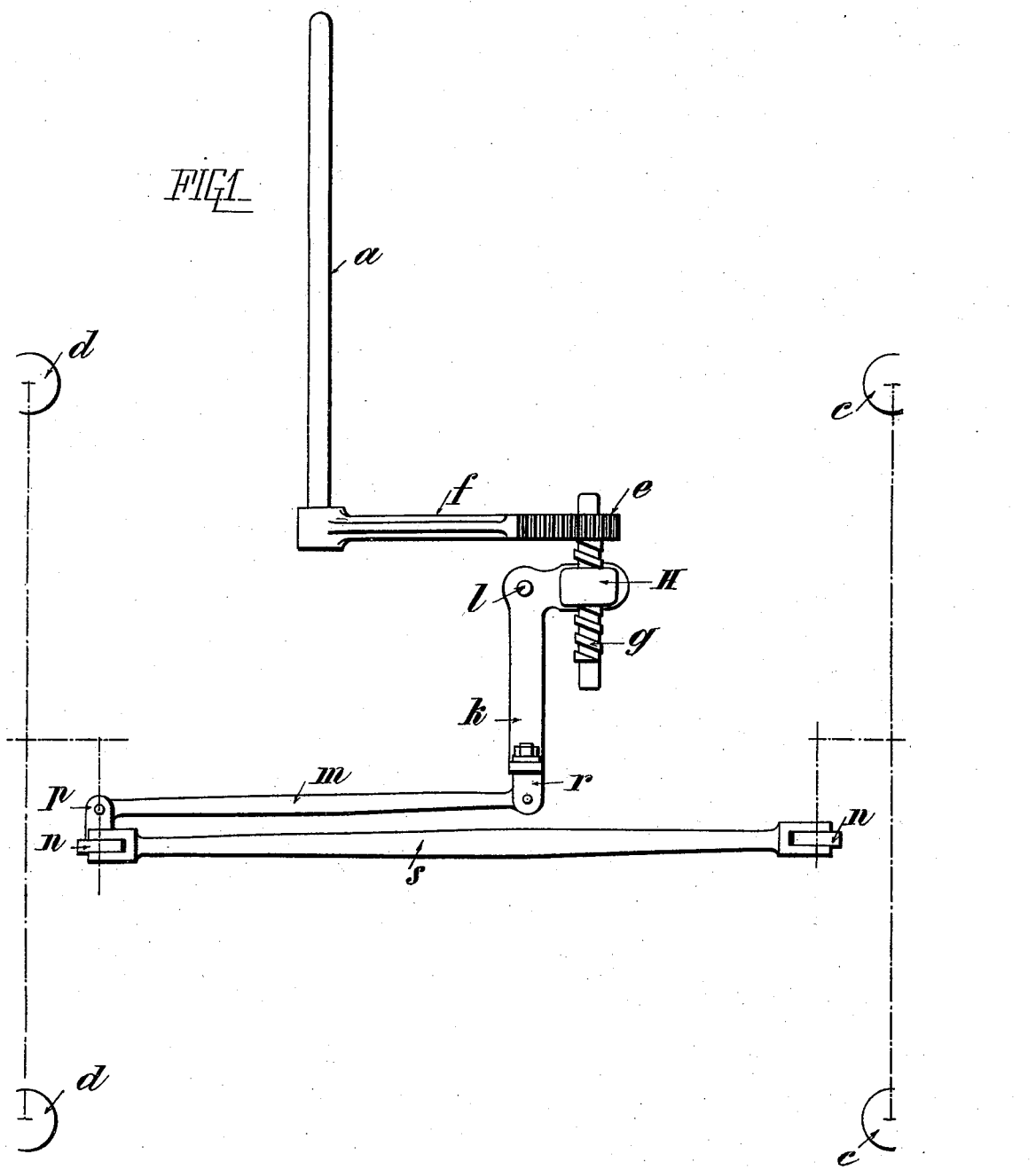

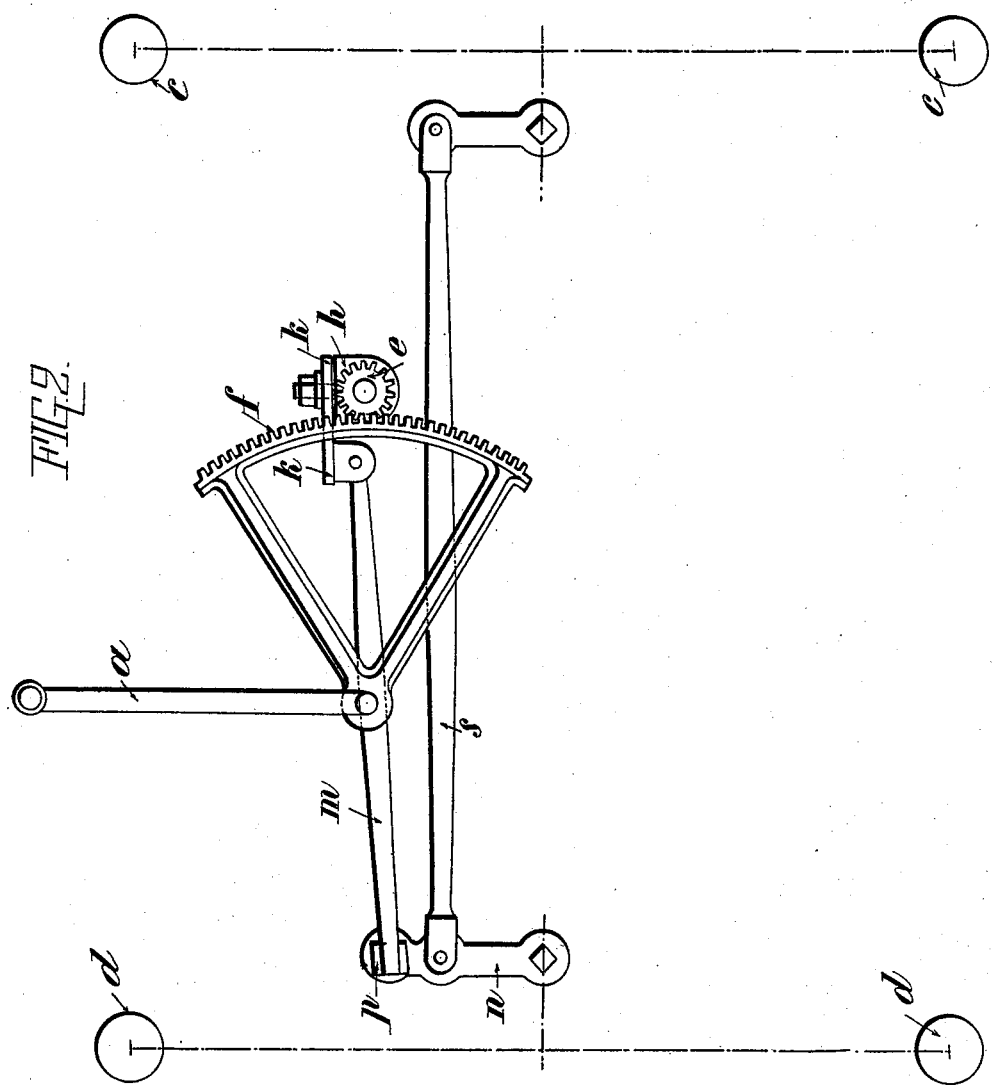

UNITED STATES PATENT OFFICE.

JEAN CANELLOPOULOS, OF COURBEVOIE, FRANCE.

STEERING APPARATUS FOR MOTOR-VEHICLES.

SPECIFICATION forming part of Letters Patent No. 635,654, dated October 24, 1899.

Application filed May 10, 1899. Serial No. 716,201. (No model.)

*To all whom it may concern:*

Be it known that I, JEAN CANELLOPOULOS, a citizen of the Kingdom of Greece, and a resident of Courbevoie, in the Republic of France, have invented a new and useful Improvement in or Relating to Steering Apparatus for Motor-Vehicles, which is fully set forth in the following specification.

There can be no doubt that the straight lever, called the "free bar," for steering motor-vehicles, is the easy steering-rod, par excellence; but the great inconveniences connected with it render it very dangerous.

It is for the purpose of avoiding these inconveniences that I have invented the improvements which are the subject of the present application.

It is easy to understand that all the levers employed up to the present time, whatever be their shape, suffer from the inconvenience that when the steering-wheels meet with an obstacle the steering-rod is violently shaken or twisted, from which many serious accidents have resulted. Further, it is impossible for the driver in charge of the vehicle to rest for a single instant, for if he did so in releasing the steering-handle the vehicle will no longer be directed.

In order to make as clear as possible the explanations which are about to follow, I have represented, by way of example, in the accompanying drawings my new system of steering.

Figure 1 is a front view; Fig. 2, a plan view, and Fig. 3 a side view.

The operating-lever consists of a bar $a$, provided with a handle $b$. Instead of acting directly on the wheels $c$ and $d$ I interpose a gear $e$, which is actuated by the lever $a$ through a toothed sector $f$. The gear $e$ actuates in its turn its screw-spindle $g$, which actuates, by means of the screw-threaded nut $h$, a lever $k$, pivoted at $l$. The lever $k$ actuates, by means of the lever $m$, the pivoted crank or lever $n$, which effects the movement of the wheels $c$ and $d$.

The parts $p$ and $r$ are pivoting-caps and have the effect of annulling the various movements of the wheels produced in consequence of irregularities of the road-surface.

The working of the device is as follows: By turning the handle $b$ in one direction it will turn the sector $f$ with it, which in its turn causes the toothed wheel $e$ to turn, thereby rotating the screw $g$ in the nut $h$. The lever $k$ thereupon rises or descends, and this movement is transmitted to the road-wheels by means of the levers $m$ and $n$. If one of the wheels $d$ or $c$ meets with an obstacle, this obstacle will turn the wheel to one side or the other, and if the lever $a$ were directly connected to the wheel, as is the case in the present device, the wheel having been turned aside by the obstacle would involve the other through the connecting-rod $s$; but as I have interposed the screw $g$ this screw prevents the lever $k$ from communicating to the lever $a$ the least movement, and if the wheel encounters any obstacle the effect of the latter will not be transmitted to the steering-handle. On the other hand, if the driver is steering in a straight line it is not necessary for him to keep his hand continually on the handle $b$; but he can leave it free, for with this device the wheels will not deviate from the direction set so long as the conductor does not move them for that purpose by means of the handle $b$.

It should be understood that the ratio of rise of the screw $g$ should be so arranged that the reactions which the wheels produce on the screw in consequence of the obstacles should not produce any recoil movement.

Of course the lever $a$ may be substituted by a wheel, if it is desired to employ a steering-wheel.

I claim—

In steering apparatus for motor-vehicles, the combination of a series of levers, a screw-nut carried by one of the levers, a screw turning in said nut, a pinion on said screw, a toothed segment meshing with the pinion, and a steering-lever on the segment, substantially as set forth.

In testimony whereof I have signed this specification in the presence of two subscribing witnesses.

JEAN CANELLOPOULOS.

Witnesses:
EMILE LEOTREL,
EDWARD P. MACLEAN.